Dec. 10, 1968    R. R. DOUGLAS    3,415,121

GAS METER

Filed Aug. 2, 1965    5 Sheets-Sheet 1

INVENTOR.
Robert R Douglas
BY Ralph Hammar
Attorney

INVENTOR.
Robert R. Douglas
BY Ralph Hammar
Attorney

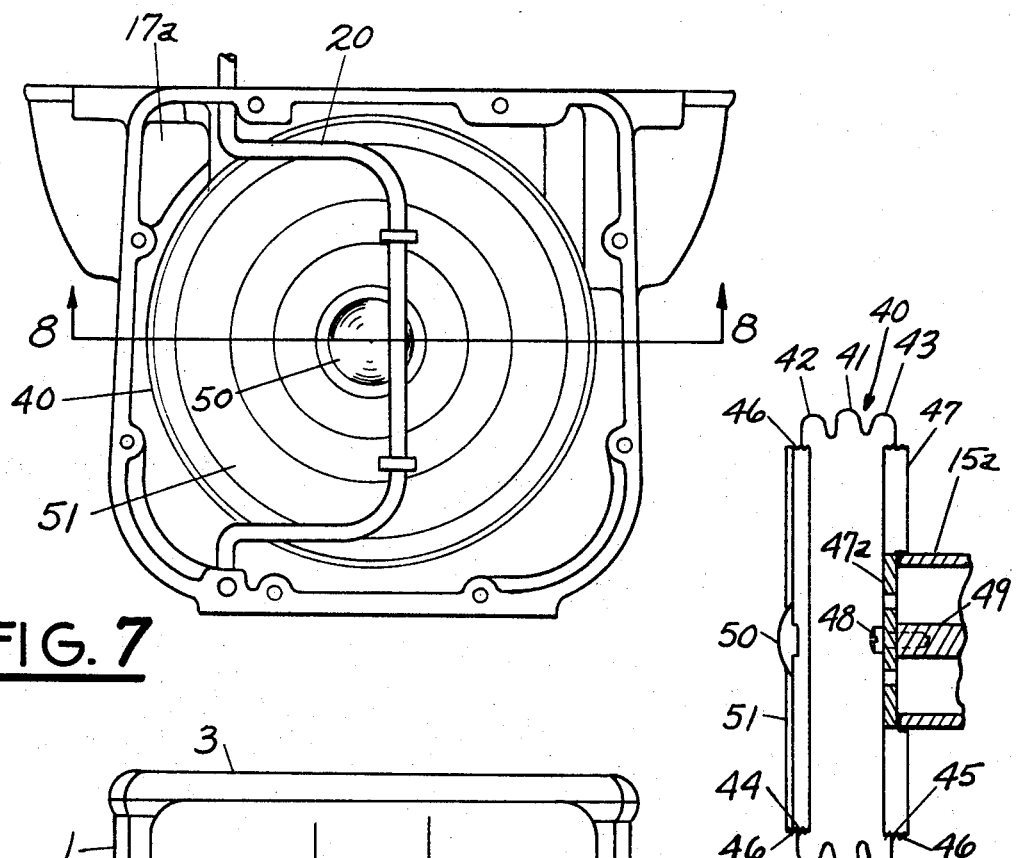
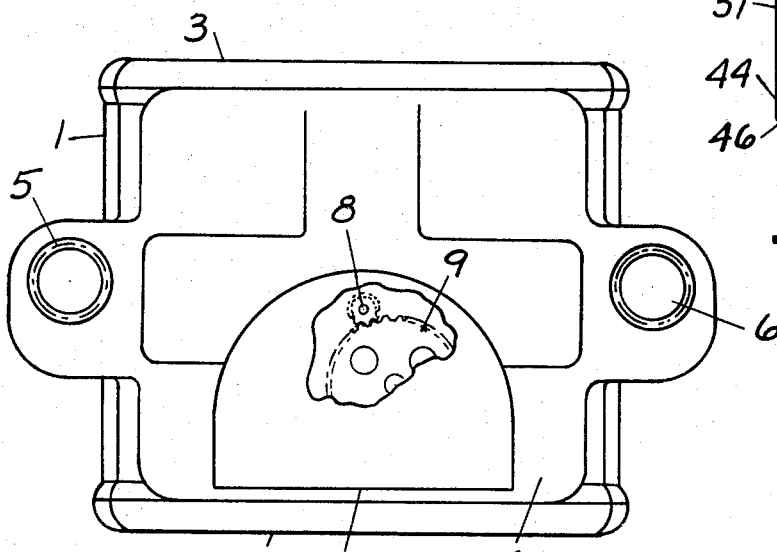
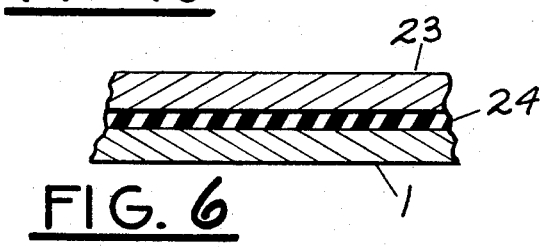

Dec. 10, 1968   R. R. DOUGLAS   3,415,121
GAS METER

Filed Aug. 2, 1965   5 Sheets-Sheet 5

INVENTOR.
Robert R. Douglas
BY Ralph Hammar
Attorney

# United States Patent Office 3,415,121
Patented Dec. 10, 1968

3,415,121
GAS METER
Robert R. Douglas, Philadelphia, Pa., assignor to American Meter Company, Incorporated, Philadelphia, Pa., a corporation of Delaware
Filed Aug. 2, 1965, Ser. No. 476,309
9 Claims. (Cl. 73—264)

ABSTRACT OF THE DISCLOSURE

A diaphragm type gas meter with a pair of measuring chambers on each side of a central partition and with a transfer valve for each pair of measuring chambers reciprocable crosswise of the partition, in which the flag rod for each pair of measuring chambers drives the same crank pin on the register drive shaft and drives the transfer valve for the other pair of measuring chambers.

---

This invention is intended to reduce the size and simplify the construction of four chamber bellows or diaphragm type gas meters. One of the features is a casing having a center partition which reduces the size of the meter. Another feature is the direct drive of the transfer valves from the flag arms and the use of a crank shaft with a single crank. A further feature is a flattened crank pin which permits adjustment of the valve timing to prevent decreased accuracy at high rates of flow.

Figure 1:
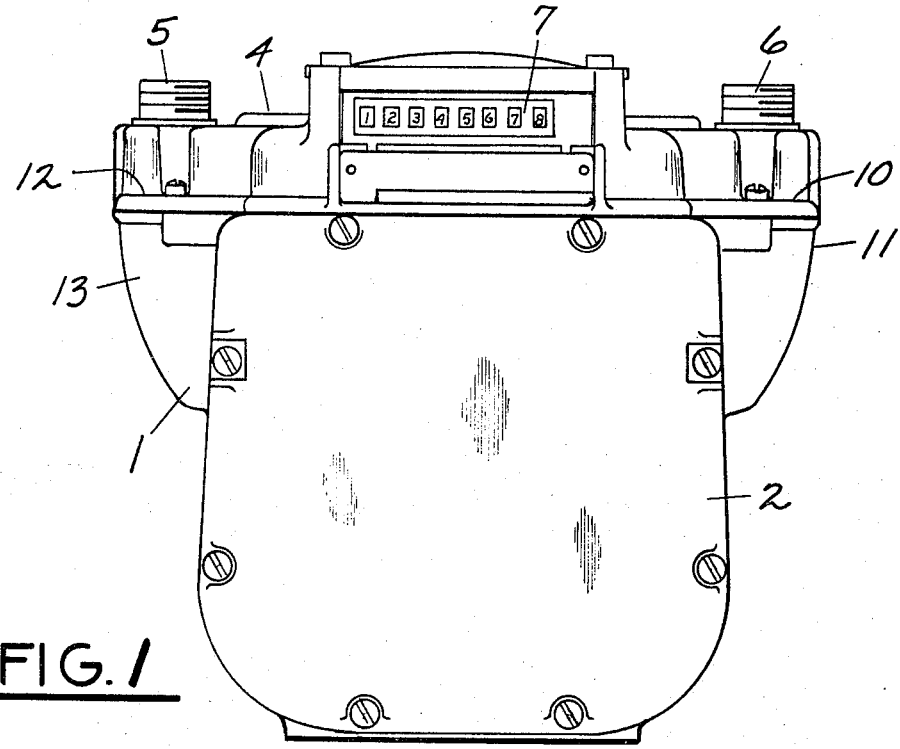
Figure 2:
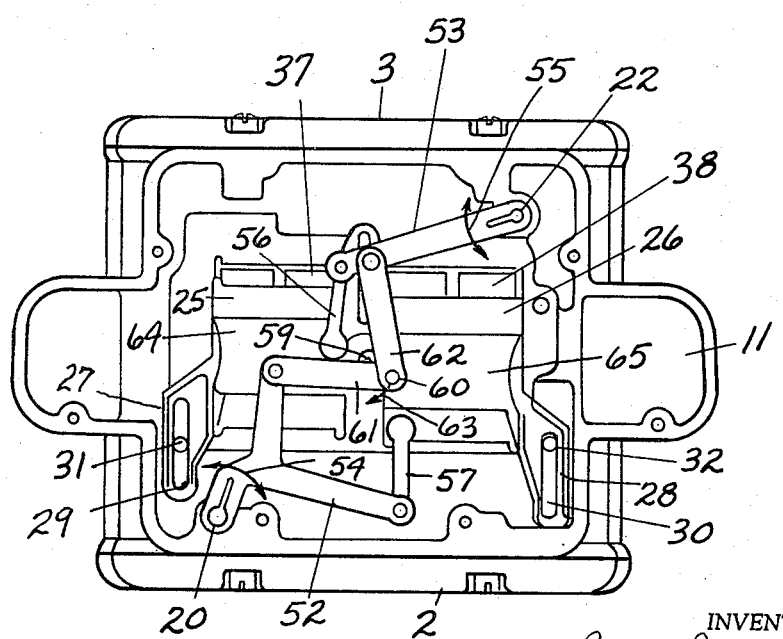
Figure 3:
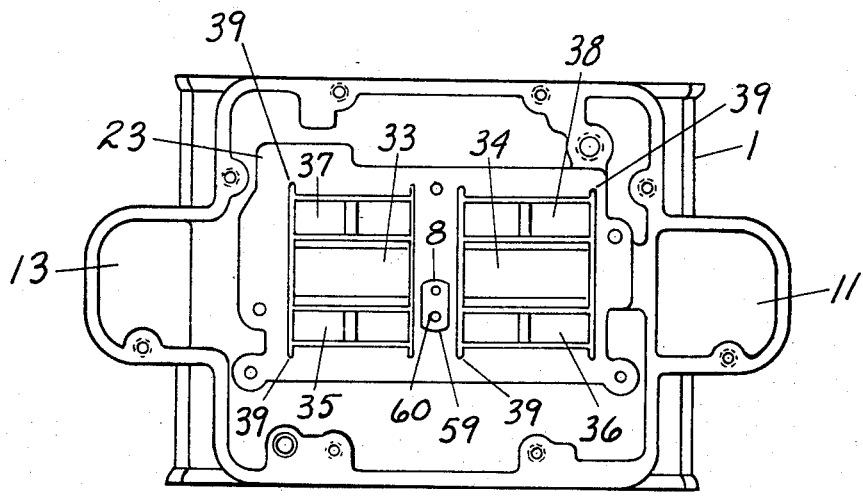
Figure 4:
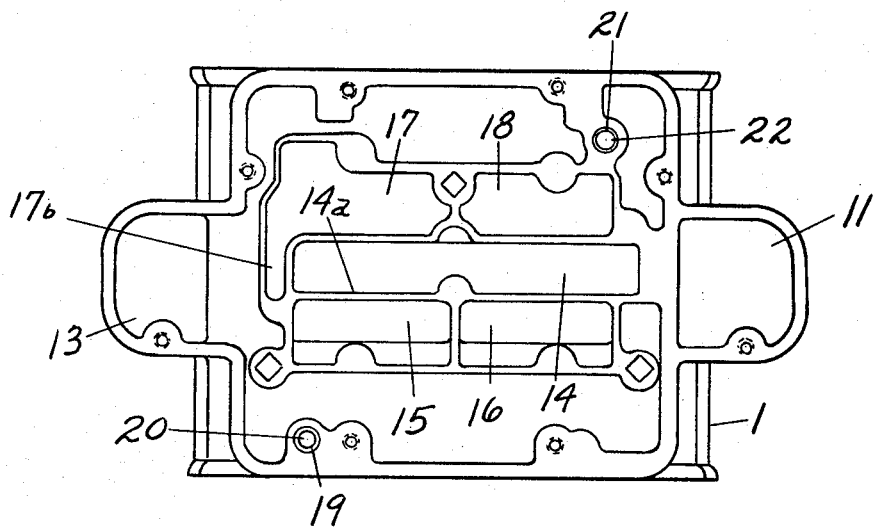
Figure 4A:
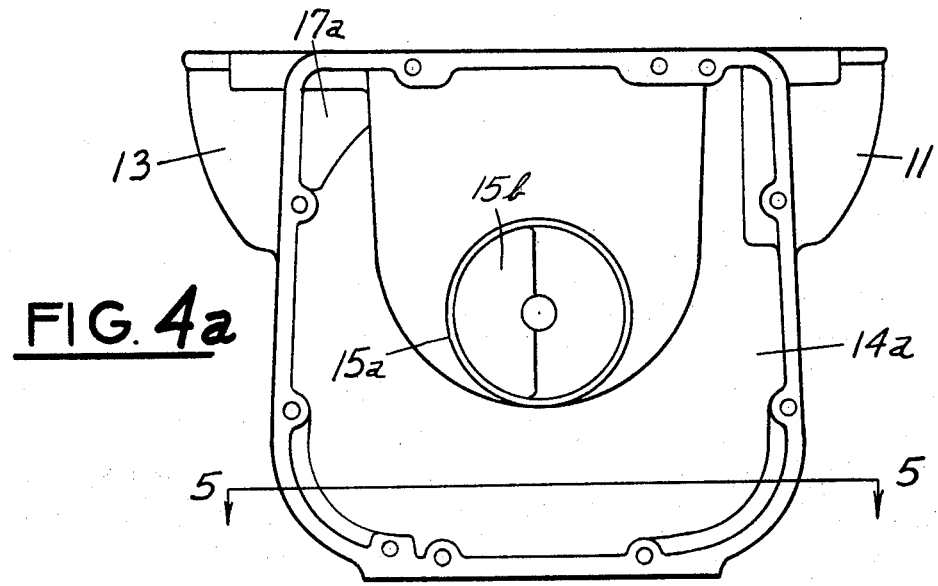
Figure 4B:
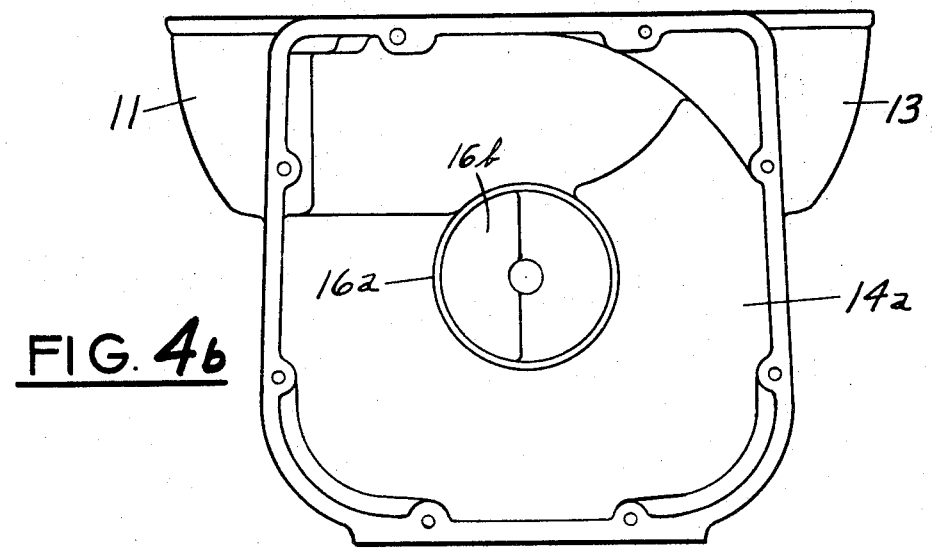
Figure 5:
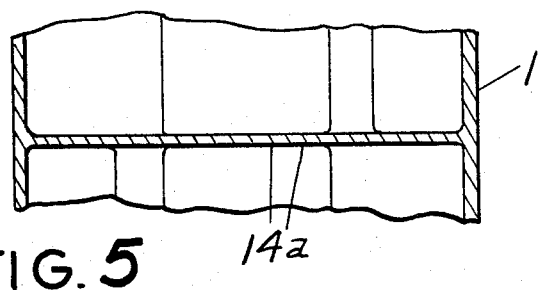
Figure 9:
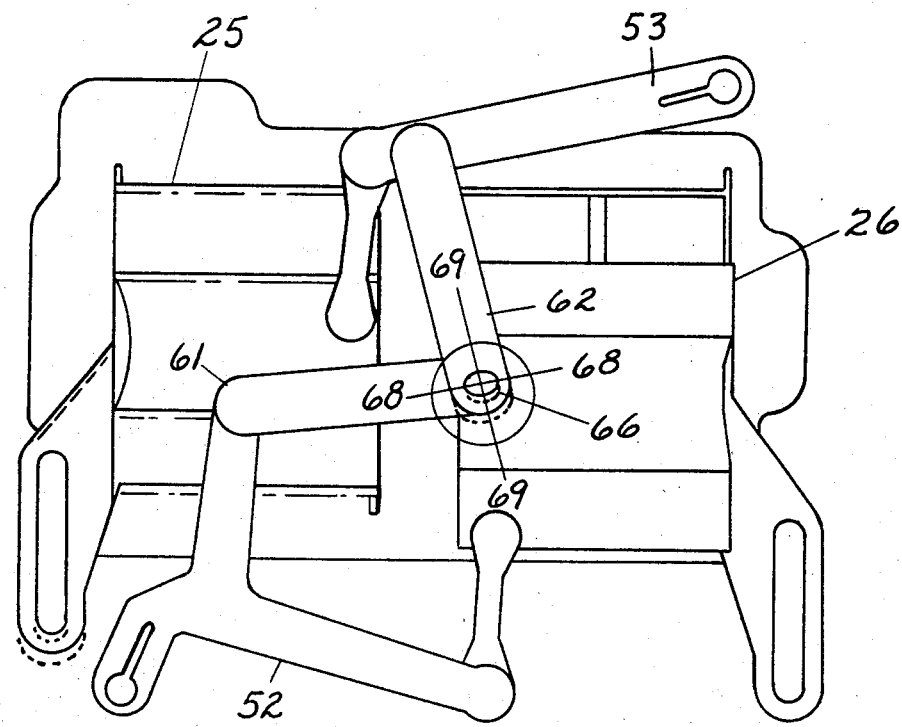
Figure 9A:
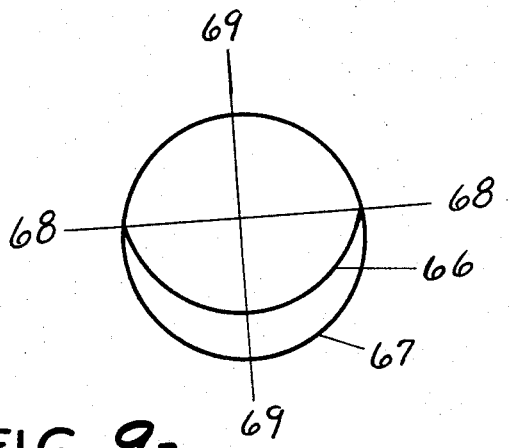

In the drawing, FIG. 1 is a front view of a gas meter, FIG. 2 is a top plan view with the cover removed, FIG. 3 is a top plan view with the valves and flag arms removed, FIG. 4 is a top plan view of the meter body, FIG. 4a is a front elevation of the meter body, FIG. 4b is a rear elevation of the meter body, FIG. 5 is a section on line 5—5 of FIG. 4a, FIG. 6 is a fragmentary section on line 6—6 of FIG. 3, FIG. 7 is a front elevation of the meter with the top and front cover removed, FIG. 8 is a section on line 8—8 of FIG. 7, FIG. 9 is a diagrammatic view of a crank pin design which changes the valve timing to improve the accuracy at high rates of flow, FIG. 9a is an enlarged view of the crank pin of FIG. 9, and FIG. 10 is a top plan view of the meter partly broken away to show the drive from the crank shaft to the meter register.

The meter casing comprises a body or casing 1, front and back covers 2 and 3 and a top cover 4. The top cover 4 has integral inlet and outlet fittings 5 and 6 for connection into a gas line. At the front of the top is a register 7 driven by a crank shaft 8 through a change gear 9 (FIG. 10). The cover 4 bolts onto the periphery of the top wall surface of the body casing and has a flange 10 registering with an outlet 11 integral with the body and a flange 12 registering with a sump or well 13 also integral with the body and communicating with the inlet chamber formed between the cover and the top of the body.

FIG. 4, the top plan view of the body casing 1, shows the valve ports and the surface to which the cover 4 is bolted. 14 indicates the outlet port which is integral with one side of a vertical central partition 14a dividing the body into two sets of measuring chambers. 15 indicates a port at the front end of the outlet port leading into a semicircular passageway 15b within cylindrical flange 15a (FIGS. 4a, 8) on the front side of the central partition. 16 indicates a port at the front end of the outlet port leading into a similar semicircular passageway 16b within a cylindrical flange 16a (FIG. 4b) on the back side of the central partition. 17 indicates a port at the back end of the outlet port leading through a crossover passageway 17a (FIG. 4a) extending through the partition 14a to the space outside the flange 15a and between the central partition and the front cover 2. 18 indicates a port at the back end of the outlet port leading to the space outside the flange 16a and between the central partition and the back cover 3. 19 indicates the bearing for the upper end of the flag rod 20 for the front chamber and 21 indicates the upper bearing for the flag rod 22 for the back chamber. The port 15 is connected at its lower end to the semicircular opening 15b within the flange 15a. The port 16 is connected at its lower end to a crossover passageway extending beneath the outlet port 14 and connected to the semicircular opening 16b within the flange 16a. The port 17 is connected to the crossover passageway 17a by a passageway 17b at one side of the outlet port 14. The lower end of the port 18 is connected directly to the space outside the flange 16a. All of the ports and the associated passageways are located in a central partition defining the diaphragm or bellows compartments.

The ports 14–18 inclusive are covered by a valve plate 23 (FIG. 3) which, as shown in FIG. 6, is cemented to the top of the body casting by a flexible epoxy cement 24. Prior to cementing, the entire top wall surface of the body casting 1 is machined flat. These flat surfaces surround the ports 14–18 inclusive. After applying cement to the flat surfaces, the under side of the valve plate 23 is pressed against the adhesive, thereby obtaining a stress-free connection which eliminates any warping of the valve plate. Accordingly, when the valve plate 23 and its associated transfer valve members 25 and 26 are made with mating flat surfaces, the mating surfaces are not distorted when the valve plate and valve members are mounted or assembled to the casing 1. By eliminating any tendency for local distortion in the valve plate, the flat engaging surfaces of the valve plate and valve members remain true for a longer period of time, thereby increasing the life of the meter.

The valve members 25 and 26 are provided with integral arms 27 and 28 (FIG. 2) with slots 29 and 30 receiving guide pins 31 and 32 fixed in the top of the body casting. The valve plate 23 (FIG. 3) has passages 33 and 34 which respectively register with the outlet port 14, and passages 35, 36, 37 and 38 which respectively register with the ports 15, 16, 17 and 18. The upper surfaces of the walls defining the passages 33–38 are true and flat and mate with corresponding flat surfaces on the under side of the valve members 25 and 26. The valve plate 23 also has guide flanges 39 cooperating with the valve members 25 and 26 to maintain alignment. The lower end of crank shaft 8 is journaled in the valve plate.

FIG. 8 shows the connection to the bellows or diaphragm forming the measuring element at the front of the gas meter. The diaphragm 40 is in the form of a bellows having a multiplicity of convolutions 41 and ends 42 and 43 respectively secured to peripheral flanges 44 and 45 by wire wrapping 46. The flange 45 is integral with a pan 47 clamped in sealing engagement with the flange 15a by a perforated plate 47a secured in place by a screw 48 threaded into a stud 49. Access to the screw 48 is obtained through a removable plug 50 at the center of the pan 51 integral with the flange 44. The bellows assembly shown in FIG. 8 is the same on both sides of the central partition of the body casing 1. The interior of the bellows on the front side of the central partition 14a communicates through the flange 15a with the port 15 so as to conduct gas to the interior of the bellows or diaphragm 40 while the space between the central partition and the outside of the bellows is connected through way 17a to the port 17. When the bellows assembly is used for the measuring chamber at the back of the meter, the flange 16a corresponding to the flange 15a is connected to the port 16 and the space between the cover and the outside of the bellows is connected to the port 18.

In the operation, gas enters through the inlet 5 to the space enclosed by the cover 4, which is at all times filled with incoming gas, and exits through the outlet 6 which is at all times connected to the outlet port 14 in the central partition 14a. The control of the flow of gas through the measuring chambers is effected by reciprocating valve members 25 and 26. The valve member 25 has its center section connected at all times to the outlet port 14 and alternately connects the ports 35, 37 to the incoming gas and the ports 37, 35 to the outlet port 14. The valve member 26 has its center section connected at all times to the outlet port 14 and alternately connects the ports 36, 38 to the incoming gas and the ports 38, 36 to the outlet port 14. The links 56, 57 actuate the reciprocation of the valves 26, 25 so that gas is laternately admitted to the interior of the bellows to expand the bellows and then is admitted to the space outside the bellows to collapse the bellows. When the bellows are being expanded, the valves 25, 26 are connected so as to discharge gas from the space outside the bellows between the covers 2, 3 and the central partition 14a and when the bellows are being contracted, the valves conect the interior of the bellows to the discharge passageway 14. The reciprocating motion of the bellows assembly is transmitted through oscillation of flag rods 20, 22, the flag rods being connected to the outer pans 51 as shown in FIG. 7.

The operation of the gas meter will be explained in connection with FIG. 2. As there shown, the flag rod 20 is fixed to a flag arm 52 and the flag rod 22 is fixed to a flag arm 53. The flag arm 52 oscillates in the direction indicated by arrow 54 and the flag arm 53 oscillates in the direction indicated by arrow 55. The flag rod 20 is driven by the bellows or diaphragm at the front of the meter associated with ports 15 and 17 and the flag rod 22 is driven by the bellows at the back of the meter associated with ports 16 and 18. A link 56 connected between the flag arm 53 and the valve 25 reciprocates the valve 25 while a link 57 connected between the flag arm 52 and the valve 26 reciprocates the valve 26. Accordingly, the flag arm driven by the bellows at the front of the meter reciprocates the valve 26 associated with the bellows at the back of the meter while the flag arm 53 associated with the bellows at the back of the meter reciprocates the valve 25 associated with the bellows at the front of the meter.

The reciprocation of the bellows is converted to rotary motion through the crank shaft 8 journaled in the valve plate 23 and having a crank arm 59 with a crank pin 60 connected to links 61 and 62 respectively driven by the flag arms 52 and 53. In operation, the crank shaft 8 turns in the clockwise direction when viewed from the top as indicated by arrow 63. In the position shown in FIG. 2, gas is being admitted through port 37 in the valve plate 23 and flows through ways 17 and 17a to the space between the front cover 2 and the outside of the bellows in the chamber at the front of the meter. This gas tends to compress the front bellows and move the flag arm 52 in a counterclockwise direction. The compression of the bellows in the chamber at the front of the meter forces gas through the passageway 35 up through the domed outlet portion 64 of the valve member 25 and through passages 33 and 14 to the outlet 11. At the same time, gas is being admitted through passageway 38 to the outside of the bellows in the chamber at the back of the meter, tending to compress the rear bellows and to move the flag arm 53 in a counterclockwise direction. The compression of the bellows at the back of the meter forces gas through passageway 16 into the domed outlet portion 65 of the valve member 26 and through passageways 34 and 14 to the outlet. The counterclockwise motion of the flag arm 53 is transmitted through link 56 to the valve member 25, moving the valve member 25 downward as viewed in FIG. 2. The counterclockwise motion of the flag arm 52 is transmitted through link 57 to the valve member 26, tending to move the valve member 26 upward as viewed in FIG. 2. As the upward motion of the valve member 26 continues, the passageway 38 is closed and the passageway 36 is opened, admitting gas to the interior of the bellows at the back of the meter and causing the flag arm 53 to change from counterclockwise to clockwise motion as viewed in FIG. 2. This reversal in direction of motion of the flag arm 53 does not change the direction of motion of the flag arm 52 which continues moving in a counterclockwise direction even though the direction of movement of the valve member 25 has been changed from downward to upward. As the upward motion of the valve member 25 continues, the port 37 is closed and the inlet port 35 leading to the interior of the bellows at the front of the meter is opened, causing expansion of the front bellows and reversing the direction of motion of the flag arm 52 from counterclockwise to clockwise as viewed in FIG. 2. The reversal of motion of the flag arm 52 reverses the direction of movement of the valve member 26.

The stroke of the valve members 25 and 26 is fixed. When the crank pin 60 is circular, the motions of the valve members 25 and 26 are 90° out of phase with each other. By making the crank pin 66 flattened or out of round or other shape in which the principal axes are of unequal length and by arranging the long axis lengthwise of the crank and the short axis crosswise of the crank, as shown in FIG. 9, it is possible to change the angularity of the valve timing and thereby alter the measuring characteristics of the meter. The shape of the crank pin can be any that has a long axis along the axis of the crank and a short axis at right angles to the axis of the crank and is confined within a rectangle. This shape might be elliptical. However, the preferable shape is established by the common area of two intersecting circles of equal diameters as shown in FIG. 9a. The flattened crank pin 66 in a bearing 67 behaves as a tight bearing along axis 68 and as a loose bearing along axis 69. Since the crank pin is being driven through links 61 and 62 which are substantially 90° apart, the driving force from link 61 can, for exhample, be along axis 68 while the driving force from link 62 is along axis 69. The tight bearing provided by the elliptical shape along axis 68 will provide close correspondence between the motion of the flag arm 52 and the valve 26 while the loose bearing provided along axis 69 will permit motion of the flag arm 53 until the looseness is taken up, this motion being shown in dotted lines in FIG. 9. As the crank shaft 8 rotates, a flattened crank pin arranged with its short axis at right angles to the crank and its long axis along the axis of the crank will advance the valves 25 and 26 at the points of reversal and thereby compensate for the drooping or reduction of the accuracy of measurement at high rates of flow. Since the reversal of the valves takes place when the associated diaphragm is either completely collapsed or completely distended, and since the reversal of valve 25 is displaced a quarter of a revolution from the reversal of valve 26, there is the same angle between the axes 68 and 69 as there is between the reversal of the valves 25 and 26.

What is claimed as new is:

1. A gas meter comprising a casing having gas inlet and outlet connections, gas measuring and register mechanism in said casing, said measuring mechanism comprising a gas inlet chamber having a wall at the top of the casing and a central partition depending from the wall and dividing the lower part of the casing into two compartments, a diaphragm in each compartment secured to the partition and forming in each compartment a pair of inner and outer measuring chambers, two transfer valves, one for each pair of measuring chambers, said transfer valves being side by side and reciprocable on said wall crosswise of the partition, valve seats for each transfer valve comprising an inner measuring chamber port on one side of the partition, and outer measuring chamber port on the other side of the partition and an outlet port between said measuring chamber ports, each transfer valve having an outlet portion between its ends alternately connected by the valve to one of the measuring chamber ports while the other measuring chamber port is uncovered by the valve and opened to the gas inlet chamber, said partition having a passageway communicating with the outlet portions of both transfer valves and with the gas outlet connection, a flag arm for each diaphragm and means for oscillating the flag arm in accordance with the movement of the diaphragm, and a register shaft having a crank pin, each flag arm having a link connected to the crank pin and a connection to the transfer valve associated with the other pair of measuring chambers.

2. A gas meter having a casing of rectangular plan with a gas inlet chamber at the top and first and second side by side transfer valves reciprocable crosswise of the casing and respectively associated with first and second pairs of measuring chambers, first and second flag rods respectively associated with the first and second pairs of measuring chambers, said flag rods being disposed at diagonally opposite sections of the case, a meter register, a register drive shaft having a crank with a crank pin, first and second arms respectively fixed to the first and second flag rods, a first and a second link connected to each arm, said first links being substantially at right angles to each other and connected from the first and second arms, to the crank pin, said second links respectively connecting the first and second arms to the second and first transfer valves.

3. A gas meter having a casing of rectangular plan with a gas inlet chamber at the top and first and second side by side transfer valves reciprocable crosswise of the casing and respectively associated with first and second pairs of measuring chambers, first and second flag rods respectively associated with the first and second pairs of measuring chambers, said flag rods being disposed at diagonally opposite sections of the case, a meter register, a register drive shaft having a crank with a crank pin, said crank pin being flattened with the long axis of the crank pin along the axis of the crank, first and second arms respectively fixed to the first and second flag rods, a first and a second link connected to each arm, said first links being substantially at right angles to each other and connected to the crank pin, and said second links respectively connecting the first and second arms to the second and first transfer valves.

4. A gas meter having a casing with a gas inlet chamber at the top and first and second side by side transfer valves respectively associated with first and second pairs of measuring chambers, first and second flag arms respectively for the first and second pairs of measuring chambers, a meter register, a register drive shaft having a crank pin, first and second links substantially at right angles to each other extending from the crank pin respectively to the first and second flag arms, a link extending from the first flag arm to the transfer valve associated with the second pair of measuring chambers, and a link extending from the second flag arm to the transfer valve associated with the first pair of measuring chambers.

5. A gas meter comprising a casing of rectangular plan with inlet and outlet connections at opposite sides of the top of the casing and a register at the front of the casing, gas measuring and register mechanism in said casing, said measuring mechanism comprising a gas inlet chamber having a wall at the top of the casing and a central partition depending from the wall and dividing the lower part of the casing into first and second compartments, first and second diaphragms respectively in the first and second compartment secured to the partition and respectively forming in each compartment a first and second pair of inner and outer measuring chambers, a first and second transfer valve respectively for the first and second pairs of measuring chambers first and second sets of valve ports respectively for the first and second transfer valves, said first set comprising a central outlet port and inner and outer ports respectively on opposite sides of the central outlet port for conducting gas respectively to the inner and outer measuring chambers of the first pair of measuring chambers, said second set comprising a central outlet port and inner and outer ports respectively on opposite sides of the central outlet port for conducting gas respectively to the inner and outer measuring chambers of the second pair of measuring chambers, said partition having at its upper end on one side of the partition a passageway communicating with the central outlet ports of both valves and the gas outlet connection, walls on the other side of the partition forming first and second side by side passageways communicating respectively with the inner measuring chamber of the first and second pair of measuring chambers and its associated valve port, first and second flag arms respectively for the first and second diaphragms, a register shaft having a crank pin, first and second links substantially at right angles to each other extending from the crank pin respectively to the first and second flag arms, a third link extending from the first flag arm to the second transfer valve, and a fourth link extending from the second flag arm to the first transfer valve.

6. A gas meter having a gas inlet chamber at the top and first and second transfer valves in said inlet chamber respectively associated with first and second pairs of measuring chambers, first and second flag arms respectively for the first and second pairs of measuring chambers, a register drive shaft in said inlet chamber having a crank arm with a crank pin, first and second links substantially at right angles to each other extending from the crank pin respectively to the first and second flag arms, a third link extending from the first flag arm to the second transfer valve, and a fourth link extending from the second flag arm to the first transfer valve.

7. A gas meter having a gas inlet chamber at the top and first and second transfer valves respectively asociated with first and second pairs of measuring chambers, first and second flag arms respectively for the first and second pairs of measuring chambers a register drive shaft in said inlet chamber having a crank arm with a crank pin, first and second links substantially at right angles to each other extending from the crank pin respectively to the first and second flag arms, a third link extending from the first flag arm to the second transfer valve, and a fourth link extending from the second flag arm to the first transfer valve, said crank pin being flattened with the long axis of the crank pin along the axis of the crank, whereby the pin introduces lost motion for forces along the short axis of the pin and thereby changes the timing of the valves.

8. A gas meter having a gas inlet chamber at the top and first and second transfer valves respectively associated with first and second pairs of measuring chambers, first and second flag arm respectively for the first and second pair of measuring chambers, a meter register crank shaft, first and second connecting rods substantially at right angles to each other extending respectively from a connecting rod bearing on the crank shaft to the first and second flag arm, a third link extending from the first flag arm to the second transfer valve, and a fourth link extending from the second flag arm to the first transfer valve, and the connecting rod bearing being flattened with the long axis of the crank pin along the axis of the crank, to introduce lost motion for forces along the short axis of the crank and thereby change the timing of the valves.

9. A gas meter comprising a casing having gas inlet and outlet connections, gas measuring and register mechanism in said casing, said measuring mechanism comprising a gas inlet chamber having a wall at the top of the casing and a central partition depending from the wall and dividing the lower part of the casing into first and second compartments, first and second diaphragms respectively in the first and second compartments and secured to the partition and respectively forming in the first and second compartments first and second pairs of inner and outer measuring chambers, first and second transfer valves respectively associated with the first and second pairs of measuring chambers, said transfer valves being side by side and reciprocable on said wall crosswise of the partition, first and second sets of valve seats respectively for the first and second transfer valves, said first set comprising a central outlet port and inner and outer ports respectively on opposite sides of the central outlet port for conducting gas respectively to the inner and outer measuring chambers of the first pair of measuring chambers, said second set comprising a central outlet port and inner and outer ports respectively on opposite sides of the central outlet port for conducing gas respectively to the inner and outer measuring chambers of the second pair of measuring chambers, the central outlet port of the first and second sets overlying one side of the partition, the inner measuring chamber ports for the first and second sets overlying the other side of the partition, the outer measuring chamber port for the first transfer valve overlying and being in direct communication with the outer measuring chamber of the first pair of measuring chambers, walls forming a crossover passageway extending from the outer measuring chamber port for the second transfer valve through the partition to the outer measuring chamber of the second pair of measuring chambers, said partition having at its upper end on one side of the partition a passageway communicating with the central outlet ports of both valves and the gas outlet connection, walls on the other side of the partition forming a pair of side by side passageways communicating respectively with the inner measuring chamber of the first and second pairs of measuring chambers and its associated valve port, first and second flag arms respectively for the first and second diaphragms, a register shaft having a crank pin, first and second links substantially at right angles to each other extending from the crank pin respectively to the first and second flag arms, a third link extending from the first flag arm to the second transfer valve, and a fourth link extending from the second flag arm to the first transfer valve.

References Cited

UNITED STATES PATENTS

| | | | |
|---|---|---|---|
| 1,149,716 | 8/1915 | Britton | 73—268 |
| 2,087,229 | 7/1937 | Baffi | 73—268 |

FOREIGN PATENTS

| | | |
|---|---|---|
| 510,010 | 9/1952 | Belgium. |
| 39,404 | 6/1936 | Netherlands. |
| 825,310 | 12/1959 | Great Britain. |
| 570,475 | 2/1959 | Canada. |
| 149,074 | 11/1952 | Australia. |
| 166,391 | 12/1955 | Australia. |

JAMES J. GILL, *Primary Examiner.*

ROBERT S. SALZMAN, *Assistant Examiner.*

U.S. Cl. X.R.

73—268, 274